(12) United States Patent
Rao et al.

(10) Patent No.: US 8,611,479 B2
(45) Date of Patent: Dec. 17, 2013

(54) METHOD FOR CORRECTING IMBALANCE ERRORS IN A DIRECT CONVERSION RECEIVER

(75) Inventors: Yadunandana N. Rao, Sunrise, FL (US); Chet A. Lampert, Sunrise, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 159 days.

(21) Appl. No.: 13/314,603

(22) Filed: Dec. 8, 2011

(65) Prior Publication Data

US 2013/0148761 A1 Jun. 13, 2013

(51) Int. Cl.
*H03D 1/04* (2006.01)

(52) U.S. Cl.
USPC .......... 375/346; 375/317; 375/345; 455/63.1; 455/67.11; 455/226.1; 455/305

(58) Field of Classification Search
USPC ......... 375/261, 284, 285, 316, 317, 319, 324, 375/340, 344, 345, 346; 455/501, 63.1, 455/67.11, 226.1, 226.2, 296, 305, 313, 455/323, 324, 334; 329/318, 320, 349, 353
See application file for complete search history.

(56) References Cited

U.S. PATENT DOCUMENTS 6,035,004 A * 3/2000 Nakata ........................... 375/340
7,130,359 B2 10/2006 Rahman

| | | | | |
|---|---|---|---|---|
| 2003/0165203 A1* | 9/2003 | Mohindra | ................. | 375/324 |
| 2005/0009493 A1* | 1/2005 | Yang et al. | ................. | 455/313 |
| 2008/0013654 A1* | 1/2008 | Rick et al. | ................. | 375/345 |
| 2011/0081877 A1* | 4/2011 | Seendripu et al. | ......... | 455/196.1 |

OTHER PUBLICATIONS

J. Cavers et al—"Adaptive Compensation for Imbalance and Offset Losses in Direct Conversion Transceivers"—IEEE Transactions on Vehicular Technology, vol. 42, No. 4, pp. 581-588—Nov. 1993.

* cited by examiner

*Primary Examiner* — Dac Ha
(74) *Attorney, Agent, or Firm* — Barbara R. Doutre

(57) ABSTRACT

A communication system comprises a direct conversion receiver for correcting imbalance errors. The direct conversion receiver receives a radio frequency (RF) signal and converts the RF signal to baseband signals. The direct conversion receiver further translates the baseband signals to digital signals having a direct current (DC) offset and applies a DC offset correction to the digital signals having the DC offset to generate first DC offset corrected signals. An imbalance correction unit of the direct conversion receiver applies an imbalance correction to the first DC offset corrected signals by estimating an error between an average envelope of the first DC offset corrected signals and an average envelope of second DC offset corrected signals. The imbalance correction unit is fixed at initial imbalance parameter values. The direct conversion receiver further updates the initial imbalance parameter values of the imbalance correction unit based on the estimated error for correcting imbalance errors.

19 Claims, 4 Drawing Sheets

METHOD FOR CORRECTING IMBALANCE ERRORS IN A DIRECT CONVERSION RECEIVER

FIELD OF THE DISCLOSURE

The present disclosure relates generally to a direct conversion receiver in a communication system and more particularly to a method for correcting imbalance errors in the direct conversion receiver operating in the communication system.

BACKGROUND

In modern mobile communications, direct conversion receivers are widely used for wireless communications due to their lower complexity and lower power consumption. In a direct conversion receiver, a received radio frequency signal is down-converted to baseband In-phase (I) and Quadrature-phase (Q) signal components to estimate the phase and amplitude of the received radio frequency signal. In an ideal case, the phase difference between the baseband I and Q signal components should be 90 degrees in order to correctly estimate the phase and amplitude of the received radio frequency signal. However, due to temperature dependencies and production imperfections in the direct conversion receiver, the phase difference between the baseband I and Q signal components may not be exactly 90 degrees causing an amplitude and phase imbalance to occur between the baseband I and Q signal components. The amplitude imbalance refers to deviation/error between amplitudes of the baseband I and Q signal components. Similarly, the phase imbalance refers to deviation/error between phase of the baseband I and Q signal components. This amplitude and phase imbalance between the baseband I and Q signal components degrades the reception performance of the direct conversion receiver resulting in audible distortion.

The above mentioned problem of the amplitude and phase imbalance between the baseband I and Q signal components is well known in the art and several approaches exist for estimating and correcting this amplitude and phase imbalance. However, the existing methods make use of either training signals/tone or preamble signal, and such training sequences are difficult to build requiring significant software and hardware modifications. In fact, two way radios that support analog mode do not use preamble signals making it very difficult to estimate and correct the amplitude and phase imbalance errors.

Some of the existing methods estimate the amplitude and phase imbalance errors between the baseband I and Q signal components using a High Order Statics (HOS) technique. The HOS technique makes assumptions about the signal sources thus making it unsuitable for constant envelope FM based 2-way radio. Moreover, HOS techniques are computationally intensive making it infeasible for implementation on an embedded platform.

Therefore, there is a need for a solution that does not require use of any training sequences, preamble signals or HOS technique for estimating and correcting the amplitude and phase imbalance between the baseband I and Q signal components.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
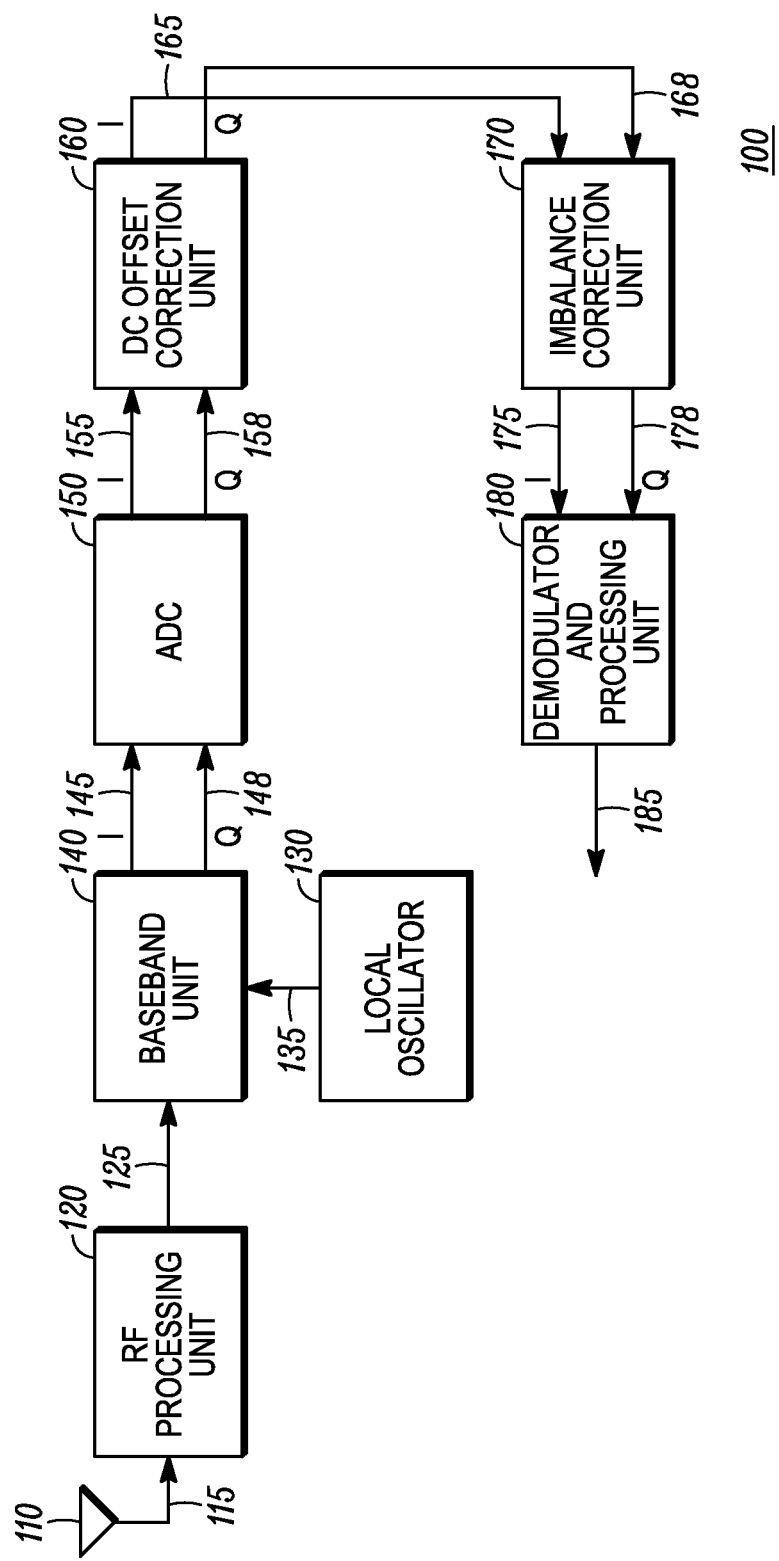
FIG. 1 is a block diagram of a direct conversion receiver in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A communication system comprises a direct conversion receiver for correcting imbalance errors. The direct conversion receiver receives a radio frequency (RF) signal and converts the RF signal to baseband signals. The direct conversion receiver further translates the baseband signals to digital signals having a direct current (DC) offset and applies a DC offset correction to the digital signals having the DC offset to generate first DC offset corrected signals. An imbalance correction unit of the direct conversion receiver then applies an imbalance correction to the first DC offset corrected signals by estimating an error between an average envelope of the first DC offset corrected signals and an average envelope of second DC offset corrected signals. The imbalance correction unit is fixed at initial imbalance parameter values. The envelope of the second DC offset corrected signals at the output of the imbalance correction unit depends on the initial imbalance parameter values. The direct conversion receiver further updates the initial imbalance parameter values of the imbalance correction unit based on the estimated error and applies the updated imbalance parameters value to the imbalance correction unit for correcting amplitude and phase imbalance errors.

FIG. 1 is a block diagram illustrating a direct conversion receiver 100 operating in accordance with the various embodiments. Direct conversion receiver 100 comprises an imbalance correction unit 170 for correcting imbalance errors between the baseband I signal component and the baseband Q signal component. The direct conversion receiver 100 is a radio receiver that requires only a single stage of detection and filtering as it directly converts a radio frequency (RF) signal to the baseband I signal component and the baseband Q signal component. The direct conversion receiver 100 can be located in a mobile communication device capable of communicating with a communication network. The communication network can be a cellular network, a two way radio network, an IEEE 802.11 network or any other safety network. The direct conversion receiver 100 comprises an antenna 110, a radio frequency (RF) processing unit 120, a local oscillator (LO) 130, a baseband unit 140, an analog to digital converter (ADC) 150, a direct current (DC) offset correction unit 160, an imbalance correction unit 170, and a demodulator and audio processing unit 180.

The antenna 110 of the direct conversion receiver 100 receives an RF signal 115 from a transmitter and provides the received RF signal 115 to the RF processing unit 120. The RF processing unit 120 processes and filters the noise component in the received RF signal 115 and provides an output signal 125 which is the RF signal without any noise component. The output signal 125 from the RF processing unit 120 is then provided to the baseband unit 140. The baseband unit 140 also receives a signal 135 from the local oscillator (LO) 130. The baseband unit 140 converts the signal 125 to the baseband in-phase (I) signal component 145 and the baseband quadrature-phase (Q) signal component 148 by splitting the signal 125 into two substantially identical signals. The baseband unit 140 then mixes one of the signals with the signal 135 received from the LO 130 to form the baseband I-signal component and mixes the other signal with a phase shifter to form the baseband Q signal component with the amount of the phase shift being 90 degrees. The outputs from the baseband unit 140 are the baseband I signal component 145 and the baseband Q signal component 148.

The outputs 145 and 148 from the baseband unit 140 are then provided to ADC 150 to convert the baseband I signal component 145 and the baseband Q signal component 148 into digital baseband I signal component 155 and digital baseband Q signal component 158 respectively having a direct current (DC) offset. The outputs 155 and 158 from the ADC 150 are further provided to the direct current (DC) offset correction unit 160 to suppress the DC offset from the digital baseband I signal component 155 and the digital baseband Q signal component 158. The DC offset in the digital baseband I signal component 155 and the digital baseband Q signal component 158 is caused by leakage of the LO 130 energy back to the antenna 110 thus decreasing sensitivity of the direct conversion receiver 100. The DC offset correction unit 160 provides the DC offset corrected digital baseband I signal component 165 and the DC offset corrected digital baseband Q signal component 168 to the imbalance correction unit 170 as an input. In accordance with some embodiments of the present invention, the DC offset corrected digital baseband I signal component 165 and the DC offset corrected digital baseband Q signal component 168 are collectively referred as a first DC offset corrected signals.

As already discussed, the phase difference between the baseband I signal component 145 and the baseband Q signal component 148 is not exactly 90 degrees due to phase error. This phase error between the baseband I signal component 145 and the baseband Q signal component 148 is also further passed in the DC offset corrected digital baseband I signal component 165 and the DC offset corrected digital baseband Q signal component 168. The imbalance correction unit 170 in the direct conversion receiver 100 estimates the amplitude and phase imbalance between the DC offset corrected digital baseband I signal component 165 and the DC offset corrected digital baseband Q signal component 168 and corrects the estimated imbalance error. In accordance with the various embodiments, the imbalance correction unit 170 is a two-parameter adaptive system that is initially fixed at imbalance parameter values $w_1$ and $w_2$. The imbalance correction unit 170 estimates the amplitude and phase imbalance error between the DC offset corrected digital baseband I signal component 165 and the DC offset corrected digital baseband Q signal component 168 and updates the imbalance parameter values $w_1$ and $w_2$ based upon the estimated phase and amplitude imbalance error. In particular, the phase and amplitude imbalance error between the DC offset corrected digital baseband I signal component 165 and the DC offset corrected digital baseband Q signal component 168 is determined by estimating an error between an average envelope of the DC offset corrected digital baseband I signal component 165 and the DC offset corrected digital baseband Q signal component 168 and an average envelope of an I signal component 175 and a Q signal component 178 generated at the output of the imbalance correction unit 170. In accordance with some embodiments of the present invention, the I signal component 175 and the Q signal component 178 are collectively referred to as a second DC offset corrected signals and the error is estimated between an envelope of the first DC offset corrected signals and an envelope of the second DC offset corrected signals. The I signal component 175 and the Q component signal 178 are generated by the imbalance correction unit 170 using the imbalance parameter values $w_1$ and $w_2$. The estimated error is then used to update the imbalance parameter values $w_1$ and $w_2$ so that the updated imbalance parameter values can be applied to the imbalance correction unit 170 to correct the amplitude and phase imbalance errors. The updating of the imbalance parameter values $w_1$ and $w_2$ is an iterative process that is repeated until the I signal component 175 and Q signal component 178 are generated without any amplitude and phase imbalance error is generated at the output of the imbalance correction unit 170. The detailed functioning of the imbalance correction unit 170 is explained below with respect to FIGS. 2 and 3.

The outputs 175 and 178 from the imbalance correction unit 170 are thus free from any amplitude and phase imbalance errors. The amplitude and phase corrected I-signal component 175 and the Q-signal component 178 are further provided to the demodulator and audio processing unit 180 to estimate the phase and amplitude of the received radio frequency (RF) signal 115 and to produce the final audio signal 185 for the user.

Figure 2:
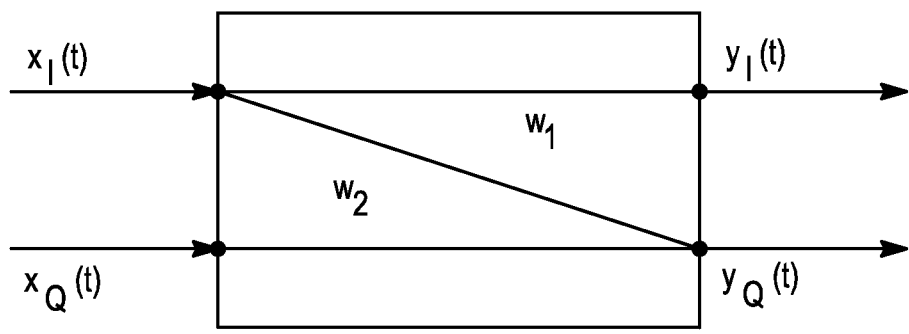
FIG. 2 shows an algorithm used in the two-parameter adaptive system of the imbalance correction unit of the direct conversion receiver of FIG. 1 in accordance with some embodiments of the present invention

FIG. 2 shows an algorithm used in a two-parameter adaptive system 200 of the imbalance correction unit 170 of the direct conversion receiver 100 of FIG. 1 in accordance with some embodiments of the present invention. The table below shows the remarks for the various notations used in the algorithm.

| Notation | Remark |
| --- | --- |
| $x(t)$ | Received input signal (complex) |
| $x_I(t)$ | Real part (in phase) of the input signal |
| $x_Q(t)$ | Imaginary part (quadrature phase) of the input signal |
| $y(t)$ | Complex signal output from the Imbalance correction entity |
| $y_I(t)$ | Real part (in phase) component of $y(t)$ |
| $y_Q(t)$ | Imaginary part (quadrature phase) component of $y(t)$ |
| $w_1, w_2$ | Imbalance parameter values estimated for correcting the amplitude and phase imbalance errors |
| $J(w_1, w_2)$ | Joint functional of the parameters $w_1, w_2$ |
| $r(t)$ | Short-term average energy of the input signal |
| $E(.)$ | Statistical Expectation operator |
| W | Window length or number of samples over which the average is computed |
| $\mu$ | Adaptation rate |

For the purposes of this application, the complex input signal to the two-parameter adaptive system 200 is represented as: $x(t) = x_I(t) + j x_Q(t)$. In accordance with some embodiments of the present invention, $x_I(t)$ represents the I signal component and $x_Q(t)$ represents the Q signal component of the DC offset corrected digital baseband signal provided to the two-parameter adaptive system 200. In an ideal case when there is no amplitude and phase imbalance between the I signal component $x_I(t)$ and the Q signal component $x_Q(t)$ of the complex input signal $x(t)$, the envelope signal $r(t)$ of the complex input signal $x(t)$ would be a constant R and a Lissajous plot of such complex input signal $x(t)$ would be a circle of radius R where:

$$r(t) = x_I^2(t) + x_Q^2(t) \tag{1}$$

However, from a practical standpoint, it is not possible to have the I signal component $x_I(t)$ and the Q signal component $x_Q(t)$ of the complex input signal $x(t)$ that are amplitude and phase imbalance free. In such cases, the radius R of the complex input signal $x(t)$ varies over time at a rate based upon the amplitude and phase imbalance in the I signal component $x_I(t)$ and the Q signal component $x_Q(t)$ of the complex input signal $x(t)$. The amplitude imbalance present in the I signal component $x_I(t)$ and the Q signal component $x_Q(t)$ of the complex input signal $x(t)$ stretches the Lissajous plot of the complex input signal $x(t)$ along one axis (real or imaginary depending on how the amplitude imbalance is modeled), but still preserves the orthogonality of the real $x_I(t)$ and imaginary $x_Q(t)$ components of the complex input signal $x(t)$. Similarly, the phase imbalance has the effect of rotating the Lissajous plot thereby introducing coupling between the I signal component $x_I(t)$ and the Q signal component $x_Q(t)$ of the complex input signal $x(t)$.

For a direct conversion receiver 100 with both amplitude and phase imbalance between the I signal component $x_I(t)$ and the Q signal component $x_Q(t)$ of the complex input signal $x(t)$, the Lissajous plot looks like a rotated ellipse. The amplitude and/or phase imbalance results in the generation of audio distortion that can be easily heard by the human ear. Further, the amplitude and/or phase imbalance can result in an increased carrier falsing which can adversely affect the overall performance of the direct conversion receiver 100.

As the amplitude and phase imbalance between the I signal component $x_I(t)$ and the Q signal component $x_Q(t)$ of the complex input signal $x(t)$ converts the circular Lissajous response into an ellipse, the two-parameter adaptive system 200 as shown in FIG. 2 can be used to de-rotate and equalize the ellipse back into a circle. The complex output $y(t)$ from the two-parameter adaptive system 200 can be given as:

$$y(t) = y_I(t) + j y_Q(t)$$

$$y_I(t) = x_I(t)$$

$$y_Q(t) = w_1 x_I(t) + w_2 x_Q(t) \tag{2}$$

Define an objective function $J(w_1, w_2)$ as, $$J(w_1, w_2) = E\{y_I^2(t) + y_Q^2(t) - R(t)\}^2 \tag{3}$$

where $R(t)$ is an estimate of the short-term average signal energy. The above expression is basically an expected value of the error between the instantaneous output sample energy and the short-term average energy. The expected value operator can be replaced by simple time averaging. An objective is to find the minimum of this error expression. Note that equation (3) is basically trying to rotate the ellipse back into a circle. Taking the gradient of (3), provides, $$\frac{\partial J(w_1, w_2)}{\partial w_1} = 2E\{y_I^2(t) + y_Q^2(t) - R(t)\}\{2y_Q(t)x_I(t)\} \tag{4}$$

$$\frac{\partial J(w_1, w_2)}{\partial w_2} = 2E\{y_I^2(t) + y_Q^2(t) - R(t)\}\{2y_Q(t)x_Q(t)\}$$

Replacing the $E(.)$ by sample mean, the gradient expression in (4) simplifies to, $$\frac{\partial J(w_1, w_2)}{\partial w_1} \approx \sum_{t=1}^{W} \{y_I^2(t) + y_Q^2(t) - R(t)\}\{y_Q(t)x_I(t)\} \tag{5}$$

$$\frac{\partial J(w_1, w_2)}{\partial w_2} \approx \sum_{t=1}^{W} \{y_I^2(t) + y_Q^2(t) - R(t)\}\{y_Q(t)x_Q(t)\}$$

In equation (5), W represents the window or block size over which the gradient is computed. Since the goal is to minimize the objective function in (3), the parameters $w_1$, $w_2$ are updated according to, $$w_1(m+1) = w_1(m) - \mu \sum_{t=1}^{W} \{y_I^2(t) + y_Q^2(t) - R(t)\}\{y_Q(t)x_I(t)\} \tag{6}$$

$$w_2(m+1) = w_2(m) - \mu \sum_{t=1}^{W} \{y_I^2(t) + y_Q^2(t) - R(t)\}\{y_Q(t)x_Q(t)\}$$

where m is an iteration index. Note that on a single window (block) of samples, there can be more than one update on the parameters $w_1$, $w_2$. The constant $\mu$ controls the adaptation rate and can be varied based on well-known adaptive signal processing techniques. In accordance with some embodiments of the present invention, the constant $\mu$ can be throttled up or down based on an estimated convergence parameter, operating clock speed, and battery life of the direct conversion receiver 100. Note that the imbalance estimation system is a time varying linear combiner operating on the original IQ samples and the outputs can be shown to be imbalance free. It is also to be noted that equation (6) is the result of using a batch gradient to minimize the objective function in (3). Although this is the preferred embodiment for a variety of reasons, any unconstrained optimization principle can be used to estimate the parameters $w_1$, $w_2$.

Figure 3:
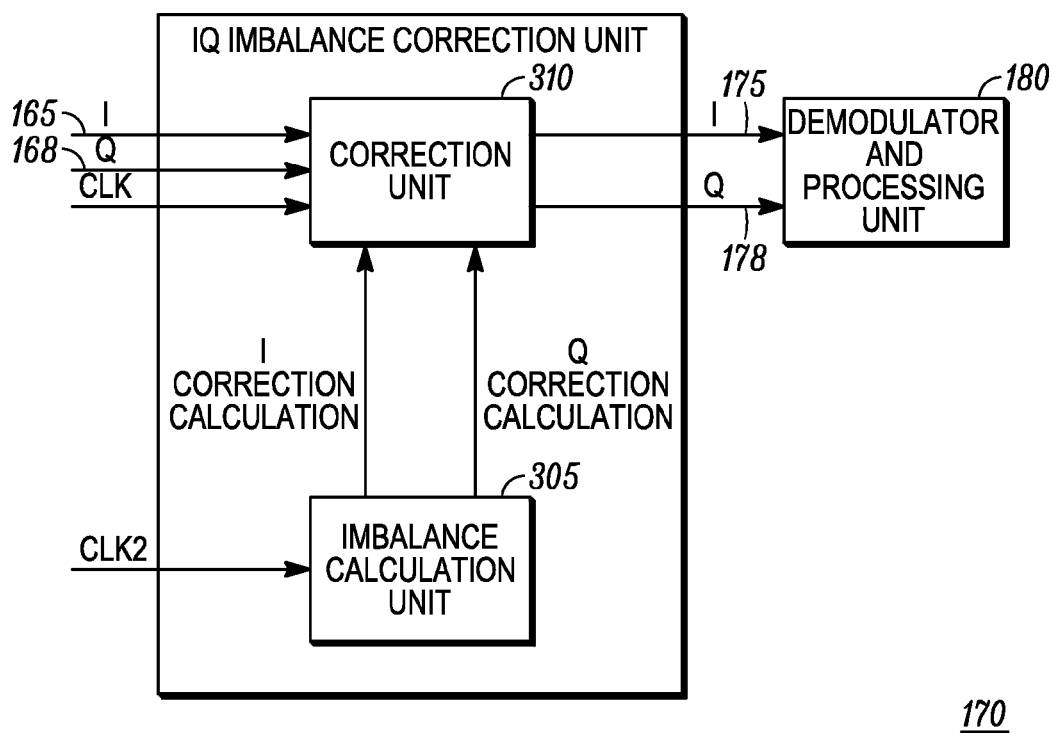
FIG. 3 shows a block diagram of the imbalance correction unit of the direct conversion receiver in accordance with some embodiments of the present invention.

FIG. 3 shows a block diagram of the imbalance correction unit 170 of the direct conversion receiver 100 in accordance with some embodiments of the present invention. The imbalance correction unit 170 comprises two units namely an imbalance calculation unit 305 and a correction unit 310. The imbalance calculation unit 305 is used to determine the amplitude and phase imbalance between the I signal component and the Q signal component of the input signal 165, 168. In accordance with some embodiments of the present invention, the I signal component and the Q signal component are DC offset corrected digital baseband I signal component and Q signal component respectively. The correction unit 310 in the imbalance correction unit 170 is initially fixed at imbalance parameters values $w_1$, $w_2$ and generates an output signal 175, 178 (having an I signal component and a Q signal component) based upon the imbalance parameters values $w_1$, $w_2$. The imbalance calculation unit 305 is used to estimate the amplitude and phase imbalance error between the I signal component and the Q signal component of an input signal provided to the correction unit 310 by estimating an error between an average envelope of the input signal (i.e. the I signal component and the Q signal component) and an average envelope of the instantaneous output signal of the correction unit 310. The imbalance calculation unit 305 provides the estimated error to the correction unit 310 to update the imbalance parameters values $w_1$, $w_2$ so that the updated imbalance parameter values can be applied to the correction unit 310 to correct the amplitude and phase imbalance errors between the I signal component 165 and the Q signal component 168. The updating of the imbalance parameter values $w_1$ and $w_2$ is an iterative process that is repeated until the I signal component and the Q signal component without any amplitude and phase imbalance error is generated at the output of the correction unit 310. The imbalance calculation unit 305 is operated by a separate clock (CLK2) than the correction unit 310. The CLK2 allows the imbalance calculation unit 305 to operate at much faster rate when the imbalance error is greater than a given threshold and at a slower rate when the imbalance error is less than another given threshold. In accordance with the various embodiments, this throttling of CLK2 extends battery life savings in the direct conversion receiver, which is particularly beneficial in portable product applications. The throttling, operating in accordance with the various embodiments, also allows faster imbalance correction on a channel with a phase imbalance error.

The imbalance correction unit 170 is selectively enabled and configured based on signal strength and the carrier frequency offset of the I signal component and Q signal component of the input signal 165, 168. In accordance with an embodiment of the present invention, the imbalance correction unit 170 is disabled when the signal strength of the I signal component and Q signal component of the input signal 165, 168 falls below a threshold value. In accordance with some embodiments of the present invention, the imbalance correction unit is disabled when the input signal is a digitally modulated signal. In accordance with some embodiments of the present invention, the enablement and configuration of the imbalance correction unit 170 also depends upon the settings of the direct conversion receiver that can be personalized by the user. In accordance with some embodiments of the present invention, the settings can comprise, but are not limited to, an operating bandwidth of the direct conversion receiver and configuration of the direct conversion receiver i.e. whether the direct conversion receiver is configured for receiving digitally modulated signals or analog FM signals.

Figure 4:
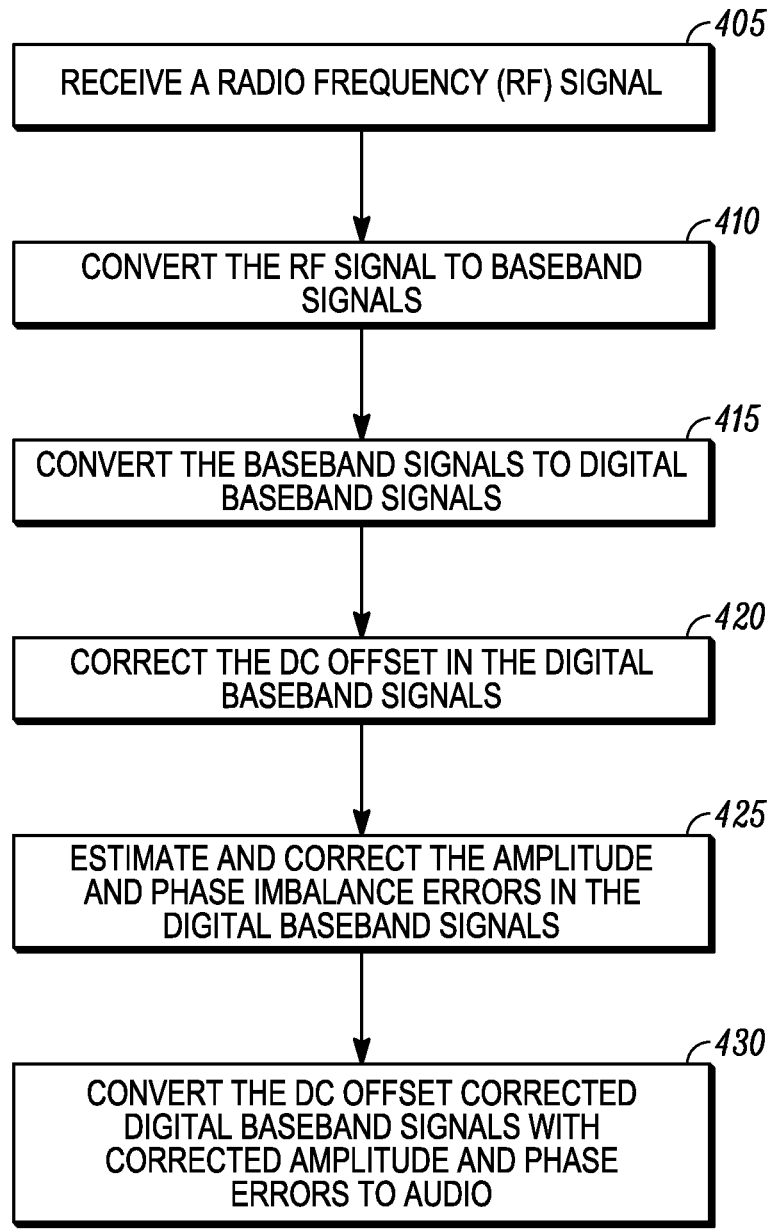
FIG. 4 is a flowchart of a method for correcting imbalance errors in the direct conversion receiver of FIG. 1 in accordance with some embodiments of the present invention.

FIG. 4 shows a flowchart of a method 400 for correcting imbalance errors in the direct conversion receiver 100. At 405, the direct conversion receiver 100 receives a radio frequency (RF) signal from a transmitter and down-converts the received RF signal to baseband signals in 410. In accordance with some embodiments of the present invention, the RF signal received by the direct conversion receiver is down converted to a baseband In-phase (I) signal component and a baseband Quadrature-phase (Q) signal component. This conversion is performed by splitting the RF signal into two identical signals and mixing one of the identical signal with a signal from a local oscillator (LO) and the other one of the identical signals with a phase shifter to obtain the baseband I signal component and the baseband Q signal component respectively. The phase shift applied between the baseband I signal component and the baseband Q signal component is 90 degrees in accordance with some embodiments of the present invention.

At 415, the baseband I signal component and the baseband Q signal component is converted to a digital baseband In-phase (I) signal component and the digital baseband Quadrature-phase (Q) signal component by an analog to digital converter (ADC). At 420, the digital baseband I signal component and the digital baseband Q signal component are provided to a DC offset correction unit for correcting the direct current (DC) offset in the digital baseband I signal component and the digital baseband Q signal component caused by leakage of the energy from the LO. The DC corrected digital baseband I signal component and the digital baseband Q signal component are further provided to an imbalance correction unit for estimating and correcting the amplitude and phase imbalance between the DC corrected digital baseband I signal component and the digital baseband Q signal component.

At 425, the imbalance correction unit estimates the amplitude and phase imbalance between the DC offset corrected digital baseband I signal component 165 and the DC offset corrected digital baseband Q signal component 168 and corrects the estimated imbalance error. In accordance with some embodiments of the present invention, the imbalance correction unit estimates an error between an average envelope of the DC offset corrected digital baseband I and Q signal component and an instantaneous average envelope of DC offset corrected signals at the output of the imbalance correction unit. The estimated error is then used to iteratively update imbalance parameter values $w_1$ and $w_2$ of the imbalance correction unit until the I and Q signal component at the output of the imbalance correction unit is obtained. At 430, the output from the imbalance correction block is demodulated and processed to produce an audio signal for the user.

The imbalance correction unit 170 of the present invention allows a seamless estimation of the imbalance parameters without use of any training sequences, preamble signals or HOS techniques. Also, the imbalance correction unit 170 can be selectively enabled and configured depending on the operating mode and the configuration of the direct conversion receiver.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for correcting imbalance errors in a direct conversion receiver comprising:
   receiving a radio frequency (RF) signal;
   converting the RF signal to baseband signals;
   translating the baseband signals to digital signals having a DC offset;
   applying a DC offset correction to the digital signals having a DC offset to generate first DC offset corrected signals;
   applying an imbalance correction unit to the first DC offset corrected signals by estimating an error between an average envelope of the first DC offset corrected signals and an average envelope of a second DC offset corrected signals, wherein the imbalance correction unit is fixed at initial imbalance parameter values, and the average envelope of the second DC offset corrected signals at an output of the imbalance correction unit is dependent on the initial imbalance parameter values; and
   updating the initial imbalance parameter values of the imbalance correction unit based upon the estimated error for correcting amplitude and phase imbalance errors in the first DC offset corrected signals.

2. The method of claim 1, wherein the first DC offset corrected signals are received from a DC offset correction unit.

3. The method of claim 1, wherein the first DC offset corrected signals are (i) a first DC offset corrected inphase (I) signal and (ii) a first DC offset corrected quadrature (Q) phase signal.

4. The method of claim 1, wherein the error between the average envelope of the first DC offset corrected signals received at the imbalance correction unit and the average envelope of the second DC offset corrected signals at the output of the imbalance correction unit is estimated using an objective function.

5. The method of claim 4, wherein the initial imbalance parameter values of the imbalance correction unit are updated based upon a gradient of the objective function.

6. The method of claim 5, wherein the initial imbalance parameter values of the imbalance correction unit are updated based upon the gradient of the objective function at a preconfigured rate.

7. The method of claim 1, wherein the imbalance correction unit is selectively enabled and configured based on received signal strength of the first DC offset corrected signals, a carrier frequency offset of the first DC offset corrected signals, and personal settings of the direct conversion receiver.

8. The method of claim 1, wherein the imbalance correction unit is disabled when the first DC offset corrected signals are digitally modulated signals or when signal strength of the first DC offset corrected signals falls below a threshold.

9. The method of claim 1, further comprising:
   throttling up or down an imbalance correction adaption rate of the imbalance correction unit based on an estimated convergence parameter, operating clock speed, and battery life.

10. The method of claim 1, wherein the imbalance correction unit is within the direct conversion receiver.

11. An apparatus for correcting imbalance errors in a direct conversion receiver, the apparatus comprising:
    at an imbalance correction unit:
       receiving first Direct Current (DC) offset corrected signals at an input of the imbalance correction unit;
       generating, a second DC offset corrected signals at an output of the imbalance correction unit;
       estimating an error between an average envelope of the first DC offset corrected signals and an average envelope of second DC offset corrected signals, wherein the imbalance correction unit is fixed at initial imbalance parameter values, and the average envelope of the second DC offset corrected signals at the output of the imbalance correction unit is dependent on the initial imbalance parameter values; and
       updating the initial imbalance parameter values of the imbalance correction unit based upon the estimated error for correcting amplitude and phase imbalance errors in the first DC offset corrected signals.

12. The apparatus of claim 11, wherein the first DC offset corrected signals are received from a DC offset correction unit.

13. The apparatus of claim 11, wherein the first DC offset corrected signals are (i) a first DC offset corrected inphase (I) signal and (ii) a first DC offset corrected quadrature (Q) phase signal.

14. The apparatus of claim 11, wherein the error between the average envelope of the first DC offset corrected signals received at the imbalance correction unit and the average envelope of the second DC offset corrected signals at the output of the imbalance correction unit is estimated using an objective function.

15. The apparatus of claim 14, wherein the initial imbalance parameter values of the imbalance correction unit are updated based upon gradient of the objective function.

16. The apparatus of claim 15, wherein the initial imbalance parameter values of the imbalance correction unit are updated based upon gradient of the objective function at a preconfigured rate.

17. The apparatus of claim 11, wherein the imbalance correction unit is selectively enabled and configured based on received signal strength of the first DC offset corrected signals, a carrier frequency offset of the first DC offset corrected signals, and personal settings of the direct conversion receiver.

18. The apparatus of claim 11, wherein the imbalance correction unit is disabled when the first DC offset corrected signals are digitally modulated signals or when signal strength of the first DC offset corrected signals falls below a threshold.

19. The apparatus of claim 11, wherein the imbalance correction unit is within the direct conversion receiver.

* * * * *